July 21, 1964  P. FORTESCUE ETAL  3,141,829
FUEL ELEMENT
Filed April 19, 1960  4 Sheets-Sheet 4

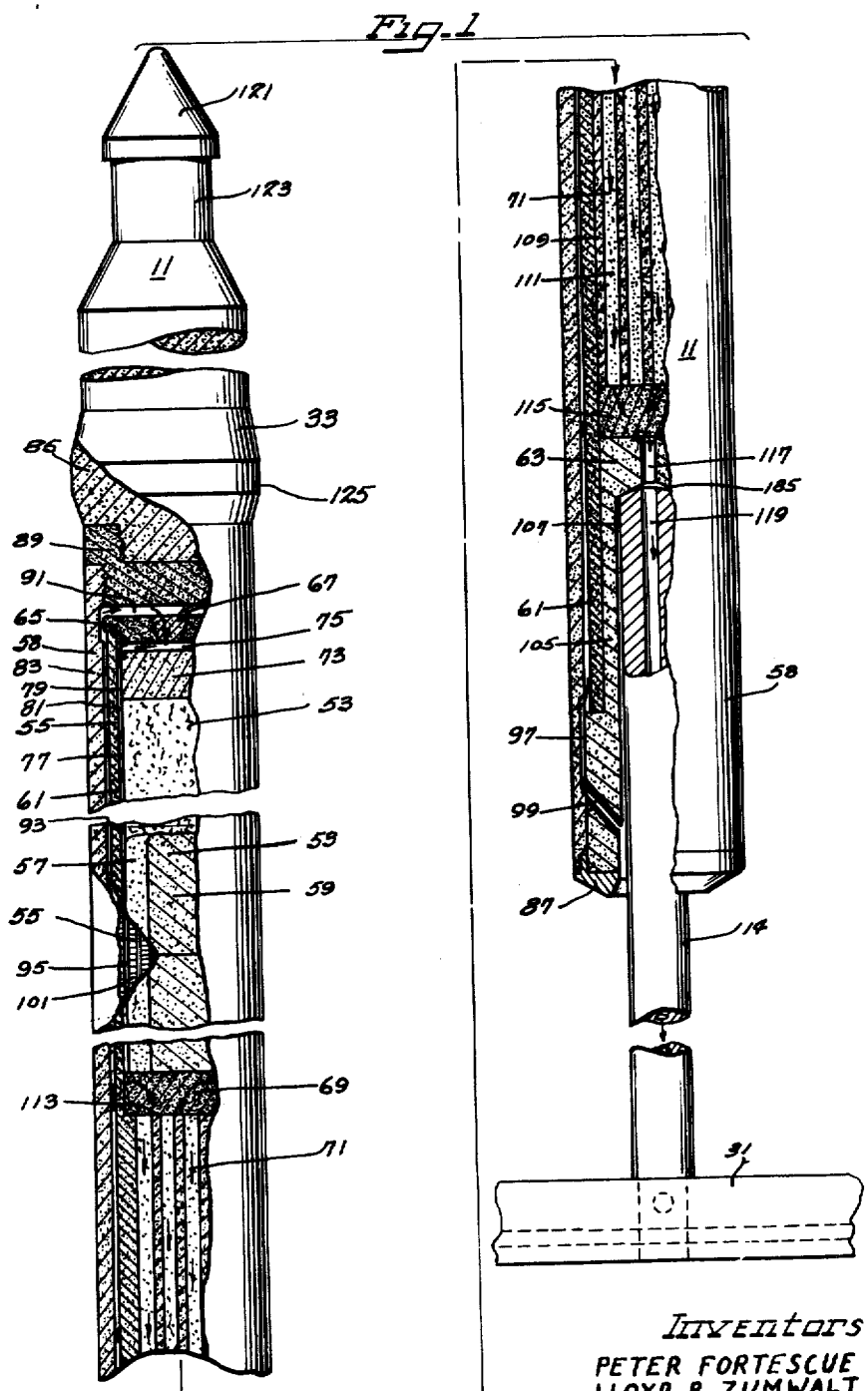

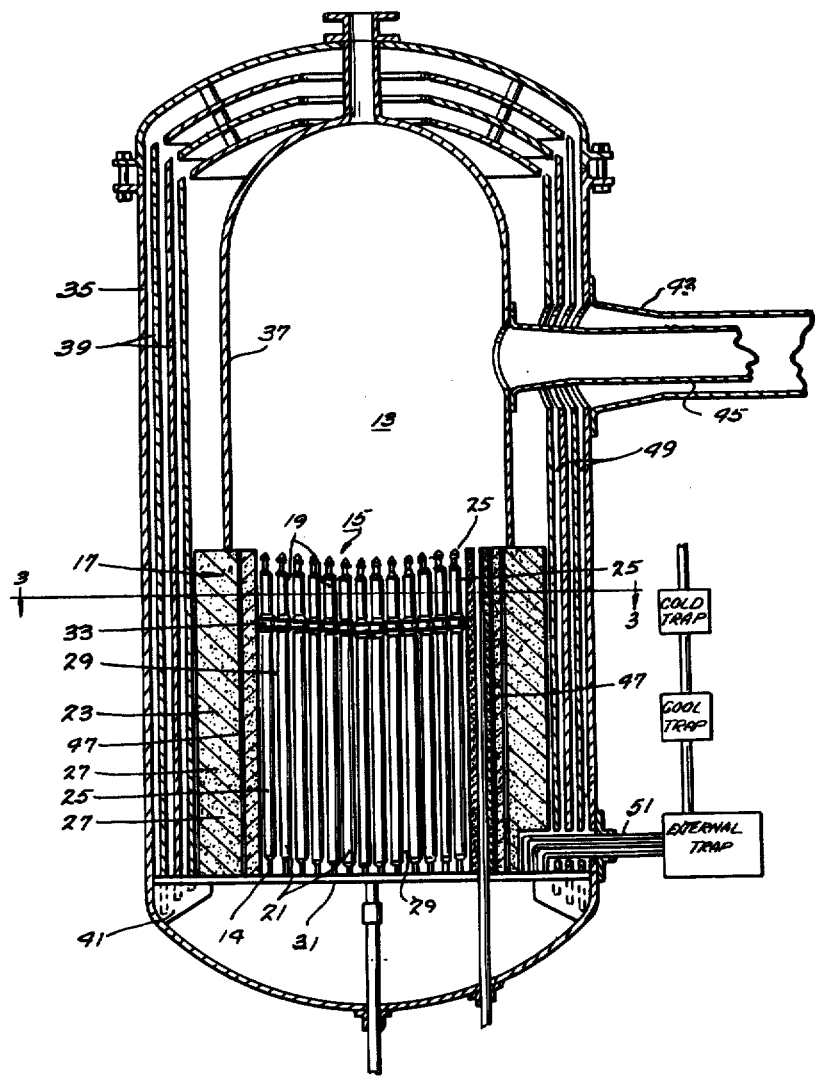

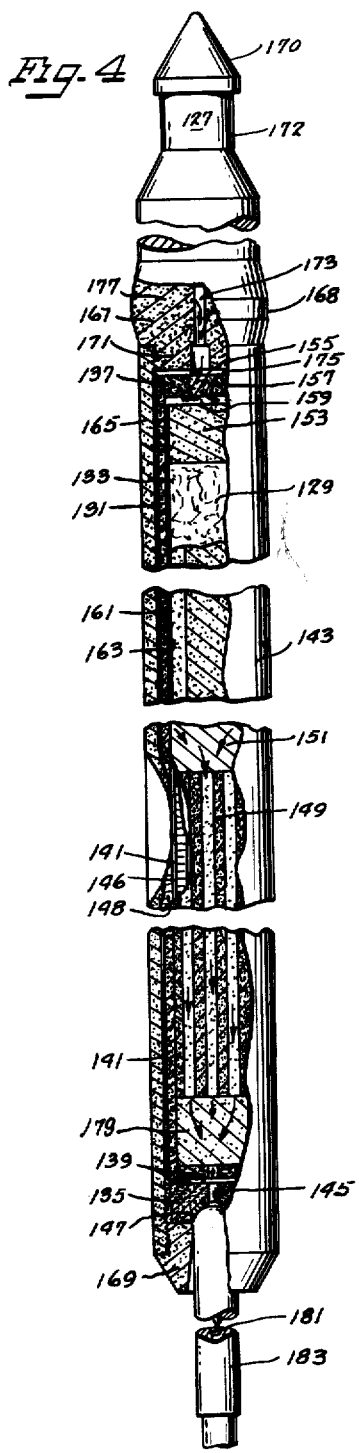
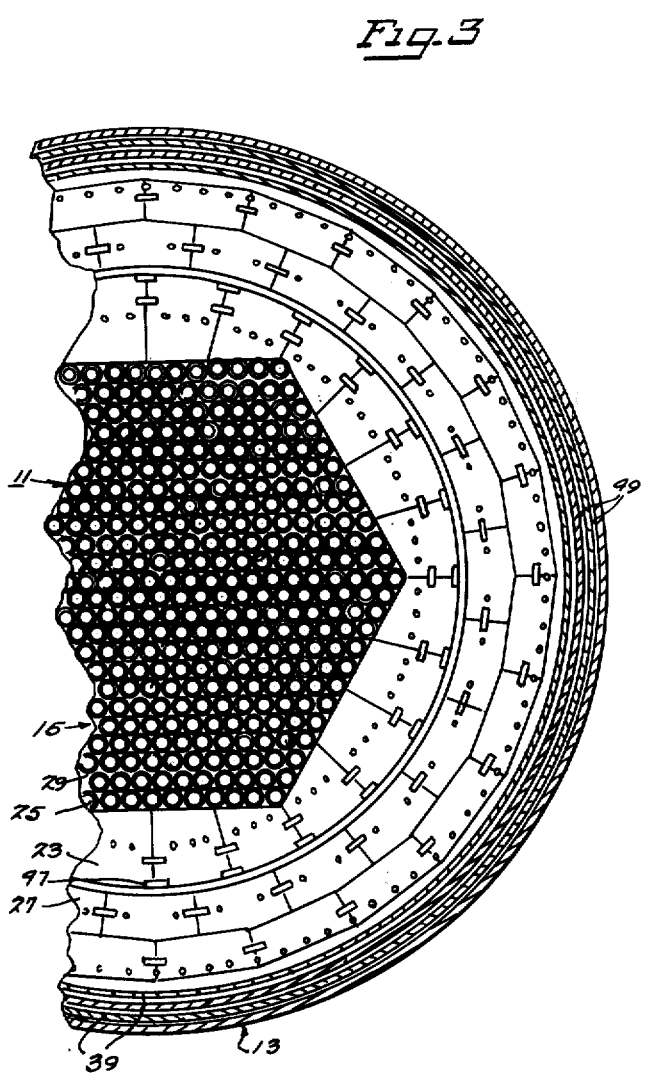

INVENTORS
PETER FORTESCUE
LLOYD R. ZUMWALT
DAVID C. MORSE
BY
ATTY

United States Patent Office 3,141,829
Patented July 21, 1964

3,141,829
FUEL ELEMENT
Peter Fortescue, San Diego, Lloyd R. Zumwalt, Rancho Santa Fe, and David C. Morse, San Diego, Calif., assignors, by mesne assignments, to the United States of America as represented by the United States Atomic Energy Commission
Filed Apr. 19, 1960, Ser. No. 23,341
9 Claims. (Cl. 176—68)

The present invention generally relates to fuel elements for neutronic reactors and more particularly relates to fuel elements for high temperature, gas cooled neutronic reactors, which fuel elements include means for attenuating the migration of fission products therefrom.

In the generation of power by neutronic reactors operating by the well-known fission process, economy is a prime consideration, as it is with other types of power generators. In this connection, it is, of course, important to obtain as high a degree of efficiency as possible in the transfer of heat from the reactor's core fuel to the cooling medium. It is also of advantage to be able to provide a high power density so as to be able to generate a large amount of heat in a relatively small core under controlled conditions.

Gas cooled neutronic reactors offer the possibility of increasing the thermal efficiency of heat transfer from the reactor core since their coolants do not limit their temperature of operation, as is the case with liquid cooled systems. At higher operating temperatures of which gas cooled neutronic reactors are theoretically capable, the thermal efficiency in transferring heat from the reactor core to the coolant is considerably increased.

Various types of gas cooled neutronic reactors have been utilized heretofore for the generation of power and for other purposes. Examples of typical gas cooled neutronic reactors are as set forth in U.S. Patent No. 2,827,429 to Binner et al., U.S. Patent No. 2,831,807 to McGarry, U.S. Patent No. 2,799,642 to Hurwitz, Jr., et al., U.S. Patent No. 2,782,158 to Wheeler and U.S. Patent No. 2,714,577 to Fermi et al., as well as British Patent Nos. 779,134 (issued July 17, 1957) and 789,022 (issued January 15, 1958). An improved fuel element for a gas cooled neutronic reactor is set forth in copending U.S. patent application of Fortescue and Zumwalt, Serial No. 753,950, filed August 8, 1958 (now U.S. Patent 3,010,889, issued November 28, 1961), and entitled Fuel Element.

It is the principal object of the present invention to provide an improved fuel element for gas cooled neutronic reactors. It is a further object of the present invention to provide an improved solid fuel element for high temperature, gas cooled neutronic reactors. Another object of the present invention is to provide a solid fuel element, a plurality of which fuel elements are capable of operating efficiently in a neutronic reactor at high temperatures to provide high power density and a high degree of efficiency of heat transfer therefrom to a coolant. It is also an object of the present invention to provide a fuel element for a neutronic reactor, which element employs a novel and efficient system for the retention and attenuation of fission products generated in the fuel element during operation of the neutronic reactor, a plurality of which elements can be utilized to form a reactor core capable of operating efficiently and economically for power generation.

It is a further object of the present invention to provide an improved fuel element for a high temperature, gas cooled neutronic reactor, in which fuel element there is a minimum migration of fission products to the primary coolant gas, thereby reducing fission product deposition within the primary coolant circuit components.

Further objects and advantages of the present invention will be apparent from a study of the following detailed description and of the accompanying drawings of which:

FIGURE 1 is a schematic fragmentary side elevation illustrating certain features of one embodiment of a fuel element in accordance with the present invention, portions being broken away to show the internal construction thereof;

FIGURE 2 is a schematic vertical section of a gas cooled neutronic reactor incorporating fuel elements embodying various features of the present invention, portions of the reactor being shown in elevation;

FIGURE 3 is a schematic sectional view of the reactor core, taken along the section line 3—3 of FIGURE 2;

FIGURE 4 is a schematic fragmentary side elevation illustrating certain features of a second embodiment of a fuel element in accordance with the present invention, portions being broken away to show the internal construction thereof;

Figure 5:
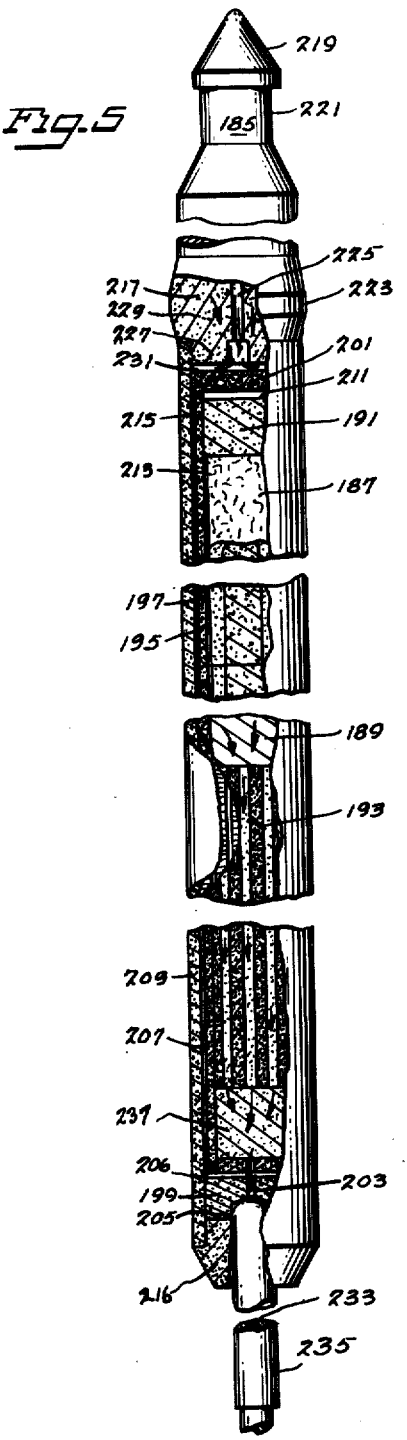
Figure 6:
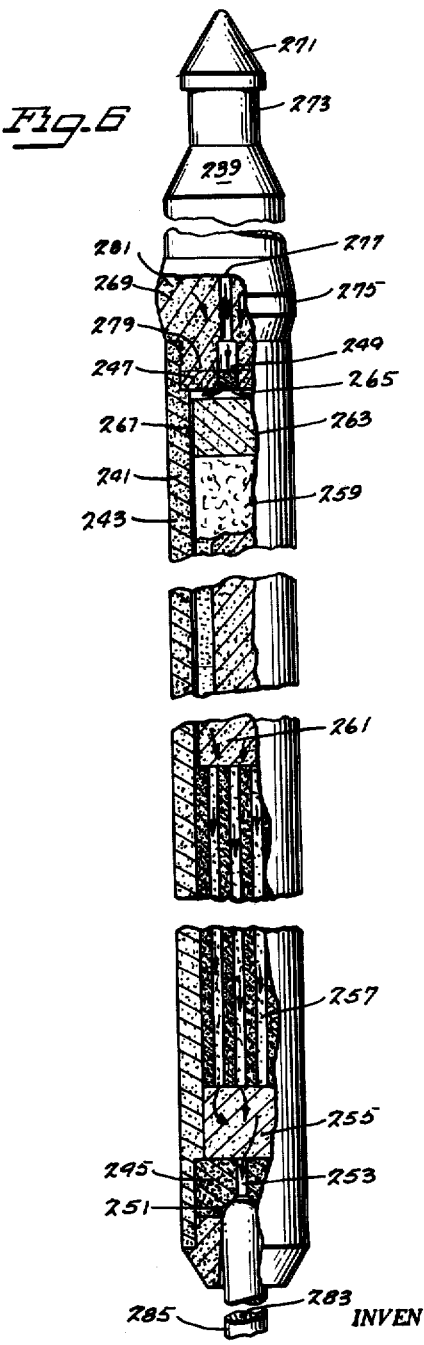

FIGURE 5 is a schematic fragmentary side elevation illustrating certain features of a third embodiment of a fuel element in accordance with the present invention, portions being broken away to shown the internal construction thereof; and, FIGURE 6 is a schematic fragmentary side elevation illustrating certain features of a fourth embodiment of fuel element in accordance with the present invention, portions being broken away to show the internal construction thereof.

It has been found that fuel elements can be provided in accordance with the present invention, which fuel elements are capable of functioning satisfactorily in a compact gas cooled neutronic reactor core over an extended period of time at high temperatures substantially in excess of 1800° F. to provide a reactor system with increased thermal efficiency, of up to about 40 percent and with increased power density. It should be understood that the fuel element of the present invention can be readily applied in conventional type gas cooled neutronic reactors.

The fuel element of the invention does not require the usual metallic jacket and fins or other extended surfaces, as are generally found in solid heterogeneous type fuel elements, and is capable of operating at higher temperatures, substantially in excess of 1800° F. with improved neutron economy and thermal efficiency.

Elimination of the metallic can would present a problem of containment (retention and/or attenuation) of radioactive volatile fission products arising during the high temperature operations. This problem is overcome, at least to a substantial degree, through the use of graphite or other thermal neutron moderator as containment for the fuel, which moderator is pre-treated so as to have a low permeability, i.e., to have a high degree of resistance to the passage of fission products therethrough. The fuel is preferably in the form of one or more fuel compacts disposed in a central portion of the fuel element between top and bottom reflectors. Each compact preferably comprises a mixture of fuel and moderator disposed around a central core of moderator.

The fuel element is provided with improved means for attenuating the passage of fission products therefrom into the primary coolant. This attenuation is in part effected by the described low permeability containment of the fuel compacts.

Moreover, provision is made for the controlled removal of fission products from the fuel element without entry into the primary coolant. In this regard, coolant gas is allowed to enter the fuel element and pass therethrough to continuously scavenge fission products and sweep them to appropriate fission product trapping means.

Preferably, although not necessarily, the fission product trapping means are disposed within the fuel elements with or without additional fission product trapping means interconnected to the fuel elements and located outside the reactor core.

Such arrangement need not completely prevent any fission products whatever from passing from the fuel elements into the primary coolant system of the reactor. Instead, it is sufficient that the arrangement remove a large portion of the fission products from circulation and attenuate or slow down the passage of the remainder of the fission products to prevent a build-up of the fission products in the primary coolant circuit (within and outside of the core) to an extent which would make maintenance of the reactor difficult or prevent its use in a safe manner over an extended period of time.

The fuel element and fission product trapping system are preferably vented to a zone of lower pressure, i.e., a point in the primary coolant circuit where the pressure is at least slightly lower than that in the coolant passages between the fuel elements. This arrangement assures that transfer of coolant through the fuel element is inwardly from the higher pressure zone external of the fuel element in the core of the reactor. Coolant gas backflow from the fuel element to the primary coolant circuit is substantially avoided and, accordingly, volatile fission products do not leak out to the primary coolant. A preferred point for such venting is one along the suction inlet to the gaseous coolant circulators of the primary coolant circuit. Continuity of the scavenging flow of coolant through the fuel elements may be further insured by the use of one or more auxiliary gas circulators (not shown), located on the line which returns the scavenging flow to the primary coolant circuit.

Referring more particularly to FIG. 1, one embodiment of the fuel element is shown. A plurality of such fuel elements 11 are also shown in FIGURE 2 uniformly spaced and generally vertically disposed within a typical gas cooled neutronic reactor 13 to form a reactor core 15. The neutronic reactor and core are more particularly described in co-pending United States application, Serial No. 775,578, filed November 21, 1958, in the names of Peter Fortescue and David Nicoll, for Neutronic Reactor. Relative heights of the individual fuel elements in the core have been exaggerated to clearly illustrate variations in the length of supporting means or stems 14. The core 15 is generally in the form of a right cylinder surrounded by a reflector 17 of neutron moderating material, such as graphite blocks, and comprising a top reflector 19 immediately above and a bottom reflector 21 immediately below the active portion of the fuel elements, and a side reflector 23 around the periphery of the fuel elements, as shown in FIGURE 2. The top and bottom reflectors form integral parts of the fuel elements. The side reflector may comprise, for example, a row of dummy fuel elements 25 formed of moderator, and a concentric ring of moderator 27.

The core and fuel elements, as illustrated particularly in FIG. 3, are generally circular in cross-section, the fuel elements being uniformly spaced apart within the core in a geometrical pattern, e.g., equilateral triangles, as shown in FIG. 3, with a fuel element at each end of each triangle.

Spaces 29 are provided between fuel elements to permit the flow of gaseous coolant (helium or other stable, non-corrosive, inert medium) therethrough. It will be understood that suitable control rods (not shown) are distributed throughout the reactor core in a suitable pattern.

The fuel element support means or stand-offs 14 are disposed on a horizontally extending grid plate 31 and aid in radially aligning the respective fuel elements within the reactor core. Moreover, the fuel elements are provided with spacing means 33 disposed on the outer surface thereof, which aid in maintaining the fuel elements properly spaced laterally from one another and also distribute the side loads for the fuel elements.

The grid plate 31 is rigidly connected to pressure vessel 35 which encloses the reactor and seals it from its auxiliary equipment. A dome shaped plenum shroud 37 as illustrated in FIGURE 2, is disposed above the reactor core, with the lower end thereof supported on the upper surface of the side reflector. A plurality of thermal shields 39 are disposed around and spaced from the sides of the reflector and from one another, the lower ends thereof terminating below the plate 31 on supporting abutments 41.

As shown in FIGURE 2, an inlet tube 43 and a concentric outlet tube 45 provide access to and from the reactor vessel for the coolant gas which circulates through a primary circuit between the reactor vessel 35, steam generators (not shown) and main circulators (not shown). Within the reactor vessel, the coolant circulates through the thermal shields, side reflector, reactor core and plenum shroud. Suitable passageways 47 and 49, respectively, are provided within the side reflector and between the thermal shields for coolant gas (FIGURES 2 and 3). Purge gas passes to fission product traps outside the reactor core through passageways 51 (FIGURE 2).

Now referring more particularly to FIGURE 1 of the accompanying drawings, an elongated fuel element 11 generally cylindrical is shown, with portions broken away to display its internal constructions. The fuel element 11 comprises, in part, a plurality of fuel compacts 53 of any suitable size and shape commensurate with the requirements of the fuel element and reactor core design. The compacts are stacked within a fuel can 55 of neutron moderating material, preferably graphite, formed or treated to provide a very low permeability to fission products. The fuel can 55 is in turn disposed within an outer container 58, hereinafter more particularly described.

Each fuel compact 53, as illustrated in FIGURE 1, comprises an outer region 57 of a mixture of fuel and moderator and a solid central core 59 of moderator. Thus, for example, the fuel compacts illustrated in FIGURE 1 are in the form of solid cylinders. It will be understood other arrangements of fuel and moderator can also be utilized for the fuel element compacts.

Each fuel compact 53 can be unitary, comprising moderator with the fuel dispersed in the moderator only in the outer region 57 of the cylinder so as to provide a solid central core 59 of unfueled moderator. Alternatively, it can be formed of two distinct components, an outer sleeve, ring 57, etc., of fuel dispersed in moderator matrix, and an inner solid core 59 of moderator, joined together. In any case, graphite is the preferred moderator for both region 57 and core 59. Such moderator may be the same as or different from the other moderator in the fuel element.

When fertile material such as uranium-238 or thorium-232 is utilized, in the fuel along with uranium-235, additional fissionable material results through neutron capture by the fertile material. The fuel life is thereby extended.

The relative proportions of fuel constituents and the amounts of such constituents within each fuel element compact and within the core of each reactor will vary, depending upon the parameters of the reactor. It is preferred that in each compact the fissionable uranium-235 plus thorium-232 concentration be maintained at not more than 40 weight percent. At any rate, the amount of the fuel constituents in the assembled fuel elements in the reactor core should be sufficient to initiate and to sustain the desired fission chain reaction for the desired core life. The amount of moderator present in each fuel element will also vary, according to the parameters of the reactor.

The following Table I sets forth a summary of characteristics of a specific 40 megawatt electrical power reactor of the gas-cooled high temperature type employing the fuel element of the present invention:

TABLE I

*Technical Data for the High-Temperature Gas-Cooled Reactor*

Operating conditions:
  Coolant _____ Helium
    Pressure, atm_____ 20
    Inlet temperature, °F_____ 660
    Outlet temperature, °F_____ 1380
  Maximum fuel-surface temperature (approx.), °F_____ 2300
  Steam temperature, °F_____ 1000
  Steam pressure, p.s.i.a_____ 1450
  Net thermal efficiency, percent_____ 34.8
  Reactor thermal output, mw_____ 115
  Net electrical power, mw_____ 40
Reactor parameters:
  Fissile investment ($U^{235}$), kg___ 190
  Thorium investment, metric tons_____ 1.19
  Core diameter, ft_____ 9.0
  Core length, ft_____ 7.5
  Core coolant voidage, percent_____ 12.8
  Fuel-element diameter, in_____ 3.50
  Number of fuel elements (approx.)____ 810
  Reflector thickness, ft_____ 2
  Core graphite weight, metric tons____ 19.5
  Reflector graphite weight, metric tons 47.7
  Pressure-vessel diameter (inside), ft 14
  Pressure vessel height, ft_____ 34
  Core graphite/uranium ratio_____ 1900
  Burn-up—
    Fissions per original fissile atom_ 0.63
    Mw.-days (heat) per metric ton of $U^{235}+Th^{232}$ _____ 75,000
  Core life (at 80% load factor), yr___ 3

The size of each fuel compact containing the fissionable and fertile mixture compacted with moderator is preferably kept small to facilitate fabrication, handling, etc., for example, about 2.25 inches in diameter and about 4.50 inches long, with a solid central core 1.50 inches in diameter. The active fuel portion of the fuel element may be, for example, 20 compacts long, i.e., about 90 inches of a total fuel element length of about 144 inches.

In the fuel compact 53, the thorium-232 and uranium-235 are preferably present as carbides, in the form of particles of relatively large size, for example, 100 microns to 300 microns, preferably about 150 microns, so that about 150 microns of moderator is disposed between the fuel particles. This distribution reduces radiation damage to the moderator of the fuel compact by recoiling fission products. Substantially homogeneous mixing of the uranium-235 and the thorium-232 with moderator can be readily accomplished when the constituents are in discrete particulate form. Graphite is preferred as the moderator in the fuel mixture, but other suitable moderator material, for example, beryllium or beryllium oxide, may also be substantially uniformly mixed therewith.

Mixing of the moderator particles with those of the fuel may be carried out in any suitable manner until the mixture is substantially homogeneous. Thereafter, the resultant mixture is compacted and densified under suitable temperature and pressure conditions, according to conventional metal working or powder metallurgy techniques, to provide a cohesive stable fuel compact of any desired size and shape.

The object of the compacting and densifying steps is to provide a finished stable solid fuel compact with few passageways between voids, i.e., as dense as readily accomplishable. This tends to reduce the rate of passage of fission products therefrom. Moreover, the finished fuel compact must be capable of withstanding temperatures of the order of 3000° F. over extended periods of time during operation of the reactor.

The core 59 and outer region 57 can be formed and assembled into the unitary compact 53 in any suitable manner. For example, the fissile material (uranium-235) fertile material (thorium-232) and moderator (graphite) etc., may first be cold pressed together to form a hollow cylinder with a hole corresponding to the central core. The cold-pressing can be facilitated by utilizing a binder, such as pitch, petroleum, etc., in the mixture. The central core of moderator (graphite) can be separately formed in a similar fashion. The cold-pressed hollow fuel cylinder and the solid core can then be slipped together and resistance hot pressed under conventional techniques to provide the composite compact exhibiting the desired fine grain and strength, stability and uniformity. Alternatively, the central core can first be formed and the fuel mixture cold pressed around the core, then hot pressed to provide a finished unit.

Various other techniques can be utilized to form, assemble and densify the unitary compact 53, i.e., a procedure such as that specified in co-pending U.S. application, Serial No. 784,064 to Goeddel et al., filed December 31, 1958 (now U.S. Patent 3,031,389, issued April 24, 1962, for Method of Making Fuel Bodies), and assigned to the assignee of the present invention.

Hot pressing operations, followed by hot sintering operations, may be utilized. In addition, various impregnating and coating techniques may be utilized to further densify the fuel compacts after they are formed, thereby further retarding the diffusion of volatile fission products therefrom.

Thus, a fuel compact is provided in which the solid central core of moderator is bonded to the annular ring comprising a mixture of fuel and moderator. The plurality of compacts, when aligned in stacked relation within the fuel element, as illustrated in FIGURE 1, form a highly effective active portion.

The fuel mixture is preferably concentrated in the annular ring as described, in order to lower the maximum fuel temperature from that in a homogenous solid cylindrical fuel compact. It will be understood that the latter type of compact can also be utilized, if desired, in the present fuel element.

The fuel compacts 53 are enclosed, as shown in FIGURE 1, in the protective can 55 of neutron moderating material having a low permeability, which can acts as a barrier against diffusion of volatile fission products.

Graphite is the preferred moderator material for the fuel can 55, in view of its high temperature physical, mechanical, thermal and nuclear properties. However, normal graphite, i.e., the usual commercial grades of graphite, are unsatisfactory per se for the purposes of the present invention, since they are, in their untreated form, relatively porous, readily permitting the passage therethrough of fission products.

Through the use of appropriate conventional densifying or pore filling steps, i.e., coating and/or impregnating, hot dipping, vapor-plating, spraying and firing, etc., a treated graphite can be prepared which has a low permeability to fission products even at temperatures in excess of 2000° F. over extended periods of time. Examples of graphite impermeabilizing techniques such as may be employed are specified in co-pending U.S. application, Serial No. 784,064, to Goeddel et al., filed December 31, 1958 (now U.S. Patent 3,031,389, issued April 24, 1962, for Method of Making Fuel Bodies), U.S. Serial No. 784,071 to Goeddel et al., filed December 31, 1958 (now U.S. Patent No. 3,001,238, issued September 26, 1961, for Method of Making Metal Bonded Carbon Bodies), and U.S. Serial No. 784,074, to Gurinsky, filed December 31, 1958 (now U.S. Patent No. 2,995,471, issued August 8, 1961, for Method for Treating Graphite Product). For the purposes of the present invention, it is preferred that the treated graphite fuel can have a permeation coefficient of from about $1 \times 10^{-5}$ cm.$^2$/sec. to $1 \times 10^{-7}$ cm.$^2$/sec. as measured for helium leakage at room temperature.

Coatings applied to graphite canning material to low the permeability thereof should become integral with the base material in order to be durable in use. That is, the coatings should be physically or chemically bonded with the base material during or after application. It is preferred that the coating also permeates down through the graphite in a diffusion zone which may be several mils thick so as to minimize damage due to differential thermal expansion between the coating and graphite. Silicon carbide and zirconium carbides have excellent high temperature stability and sufficiently low thermal neutron capture cross sections so that they can be readily utilized for such coatings.

Obviously, the size and shape of the fuel can 55 will vary. In a typical fuel element constructed as set forth in FIGURE 1 and of about 144 inch overall container length, the fuel can may be, for example, 115 inches long. The wall thickness will also vary, depending upon the strength of the canning material, its permeability, etc. For example, graphite having the described low permeability and a density of about 1.85 g./cc will be suitable for use as canning material at temperatures of up to about 2800° F., even if the wall of the can is only about 0.25 inch thick, as hereinafter described.

The fuel can 55 includes a sidewall 61 sealed and bonded at the bottom end to a support coupling 63 constructed of low permeability moderator, preferably graphite, treated as previously described with respect to the can 55 to reduce the permeability thereof. The sealing and bonding can be accomplished by zirconium brazing or the like and rendered as impermeable to fission products as the coupling and sidewall. The compacts 53 are sealed within the fuel can 55 by a top fuel can closure 65, also of low permeability moderator, sealed and bonded to the upper end of the sidewall in the previously described manner. A small plug 67 formed of coolant gas-porous moderator is disposed, as illustrated in FIGURE 1, in the top closure 65 and provides a gas porous inlet region for the can.

Within the fuel can, one or more blocks 69 of porous graphite or other moderator separate the compacts 53 from a fission product trap 71 disposed in the lower end of the can below the compacts. Block 69 serves as part of the bottom reflector 21. One or more similar porous moderator blocks 73 separate the fuel compacts from the top of the fuel can. In filling the fuel can, the coupling 63 may first be connected to the sidewall 61, then the fission product trap 71 can be inserted, followed in order by block 69, compacts 53 and block 73, top closure 65 thereupon being applied. The tolerances between fuel compacts and can sidewall are preferably fairly close, so that there is no large gap therebetween.

The moderator block 73 is dimensioned such that a space 75 is provided between the top closure 65 and blocks 73, which space is communicating with the porous plug 67 in closure 65 and with a space 77 between the compacts and the fuel can. The space 77 may be a purge space and, for example, may comprise a plurality, e.g., 8 to 24 of channels 79 between the sidewall 61 and the adjoining periphery of the fuel compacts 53 formed by longitudinal grooves (not shown) in the inner surface of said sidewall and/or in the outer surface of said compacts. Channels 79 may, for example, be semi-circular and each about 1/16 inch in diameter, and extend between space 75 and the fission product trap 71 so that fission products passing from the compacts may be swept to the trap by gas passing into the can through the porous plug 67.

The fuel can is tightly and wholly disposed within the outer container 58, also largely fabricated of neutron moderating material having a low permeability to fission products. The container 58 comprises an annular sleeve 83 of low permeability moderator, preferably treated graphite, screwed into and bonded as by brazing, etc., at the upper end thereof to a top reflector block 85 of moderator material, preferably graphite, and attached at the lower end to a bottom fitting 87 of stainless steel or other durable material, which fitting forms part of support coupling 63.

The lower portion 89 of the top reflector block is constructed of moderator material having a low permeability, preferably treated graphite, which portion 89 is separated from the top closure 65 by a space 91. Accordingly, double-walled low permeability containment of the fuel compact is offered by the can 55 and outer container 58. The permeation coefficient for the outer container is approximately that recommended for the can and limits leakage of fission products through the combined can and container to about 1 part per million of gaseous fission product formed within the can.

The top reflector block 85, together with top closure 65, moderator block 73, and the adjacent fuel can wall 61 and sleeve 83, form the top reflector 19 of the fuel element 11, while the support coupling 63, fission product trap 71, block 69 and adjacent fuel can wall 61 and container sleeve 83 form the bottom reflector 21 of the fuel element.

Although the can and sleeve fit closely together, as illustrated in FIGURE 1, a plurality, for example, 8 to 24 of purge channels 93, preferably semi-circular and each about 1/16 inch in diameter, are provided between the fuel can 55 and sleeve 83. Channels 93 are formed by longitudinal grooves 95 in the outer surface of the sidewall 61 and/or inner surface of the sleeve 83, and extend between the space 91 and an annular space 97. Space 97 is formed by a depression in the inner surface of the sleeve in the region between the lower end of the purge channels 93 and a gas inlet channel 99 formed in and adjacent the lower end of the support coupling 63, as illustrated in FIGURE 1. Accordingly, communication between the gas inlet and the can 55 is afforded so that coolant gas can pass up between the can and container and down into the can in countercurrent flow, as hereinafter more fully described.

It is generally further desirable that fission products passing through the fuel can be immediately conducted to the longitudinally aligned channels 93. In this regard, a network of relatively small grooves, scratches 101, etc., are usually present on the outer surface of the fuel can sidewall and inner surface of the sleeve, as a result of the usual machining operations in dimensioning the can and sleeve. These scratches 101 extend between channels 93 and form interconnecting channels therebetween.

The inlet channel 99 is preferably positioned as shown in FIGURE 1, a short way up the wall 105 which defines a cup shaped cavity in the coupling 63. Inlet channel 99 is apertured, as by a porous plug, etc. (not shown), to control the rate of purge gas flow into the fuel element.

In a typical reactor, such as that illustrated in FIGURE 2, having the parameters set forth in Table I, and employing 810 fuel elements constructed substantially as set forth in FIGURE 1, total flow of helium gas through the primary coolant circuit may be about 480,000 lb./hr. From the primary circuit, about 200 lb./hr. of purge helium may be drawn into the 810 fuel elements through the inlet channel 99 in each fuel element at a flow rate of about 0.25 lb./hr. per fuel element.

Accordingly, a purge gas system for each fuel element 11 is provided for sweeping fission products emanating from the fuel compacts to an internal fission product trap. Coolant purge gas enters the fuel element 11 by passing upwardly within cavity 107 between the cavity wall 105 and stand-off 14 into gas inlet channel 99, then upwardly into annular space 97 and purge channels 93, inwardly in space 91, downwardly through plug 67, outwardly in space 75, downwardly in channels 79 and into the fission product trap, sweeping fission products therewith, so as to purge or scavenge the fission products from the spaces between both the can and container, and the compacts and can. Provision is also made, as hereinafter more particularly set forth, for passage of the purge stream from the fission product trap to the standoff and out of the fuel element to external fission product traps.

The fission product trap illustrated in FIGURE 1 is formed of a moderator block 109, preferably graphite, having a plurality of spaced channels 111 drilled longitudinally therethrough. Granular fission product trapping material is contained in these longitudinal channels by porous block 69 and a similar block 115 at the top and bottom, respectively, of the trap. The bottom end block 115 of the trap is in communication with a central longitudinal passageway 117 in the coupling 63 which passageway extends to the cavity 107 and is aligned to match a similar longitudinal passageway 119 in the stand-off 14. Accordingly, purge gas passing through the fission product trap, filters through the porous bottom-end block 115 and into passageway 117, and passes therein to passageway 119 for removal from the fuel element, as for example, to external fission product traps, such as those diagrammatically set forth in FIGURE 2.

The longitudinal channels 111 in the trap may be any suitable number, for example, 6 and of any suitable size, for example, about 0.625 inch in diameter spaced on a 1.375 inch diameter circle. They should be sufficient to contain an adequate amount of fission product trapping material and to provide a suitable (radial, etc.) path to the outer surface of the fuel element for heat release. The channels 111 may be filled with any suitable material for trapping fission products present in the purge stream. It is preferred to utilize in the trap an inert, temperature stable adsorbent material, such as charcoal, in finely divided form to aid in the attenuation of the fission products. In addition, it is preferred to utilize at least one electro-positive element such as copper, silver or the like metal, interspersed with the adsorbent material to present a large total surface area.

In this regard, the fission product trap may operate to convert certain volatile fission products to less volatile forms, such as solids, solid solutions, liquids or chemisorbed forms. Since the internal fission product trap 71 is located in the cooler lower reflector portion of the fuel element, it may operate at a suitable temperature, for example, about 800° F.

The fuel can itself substantially retains those fission products which do not substantially migrate from the fuel compacts. Among the more volatile fission products which reach the internal trap in significant quantities are the following: Selenium, bromine, rubidium, strontium, cadmium, antimony, tellurium, iodine, cesium, barium, samarium and europium. Arsenic, germanium, silver and indium are less volatile and are relatively unimportant due to low yields thereof as fission product elements. Moreover, arsenic, germanium, silver and indium tend to condense in the purge channels 79 before reaching the trap 71.

As much as 90 percent or more of all fission products having half-lives of less than one hour are retained in the fuel compacts 53. Of those fission products having half-lives of about one day, as much as 50 percent or more are retained in the fuel compacts.

One suitable internal fission product trap for use in the fuel element illustrated in FIGURE 1 is constructed of porous graphite and is generally cylindrical in shape, with a length of about 12 inches and diameter of about 2.25 inches. The trap has 6 channels, each about 11 inches in length extending longitudinally down from the top of the trap, each channel being 0.625 inch in diameter and the 6 channels being spaced on a 1.375 inch diameter. The channels are filled with 300 cm.$^3$ of reagent comprising 150 grams of adsorbent activated charcoal in finely divided form so as to have a specific surface area of about 1500 m.$^2$/gm., and impregnated with about 50 grams of metallic copper. The copper is also in finely divided form. It is present on the outer surfaces of the charcoal in the form of flakes and is deposited in the pores of the charcoal.

The reagent is prepared to the indicated form by soaking, for about 2–3 days, the indicated amount of activated charcoal in an alcoholic solution containing a sufficient amount of copper nitrate to yield the indicated amount of copper in the finished reagent. The solution, if in excess, is then drained from the charcoal and the charcoal is baked at between about 400° C. and about 500° C. in an oxygen atmosphere to convert the nitrate to oxide. In this regard, the baking is carried out by first slowly heating to drive off moisture, then increasing the temperature to the indicated range. The copper oxide in the reagent is then converted to the metallic form by reduction, i.e., heating in a stream of hydrogen at about 500° C.

When silver is utilized as the electropositive metal with the activated charcoal, it can be deposited on the charcoal from an aqueous silver nitrate solution, then converted from the nitrate to oxide and reduced to the free metal in the manner described for the copper. In the finished reagent for the fission product trap, the metal, whether copper or silver or other metal, should be present in an amount of about 15 to about 30 percent by total weight of the reagent.

It will be understood the adsorbent with the reagent may, if desired, be other than or in addition to activated charcoal. For example, activated alumina may be utilized.

With regard to the action of the reagent in the fission product trap on those fission products reaching the trap, in the purge gas stream, selenium, bromine, tellurium and iodine tend to react with the metallic copper, forming low volatility copper selenide, copper bromide, etc. Cesium and rubidium react strongly with activated charcoal, whereby they are chemisorbed or otherwise chemically combined with the charcoal. This results in a very low vapor pressure for these elements over activated charcoal. For example, at 800° F., an equilibrium cesium vapor pressure of about 10$^{-8}$ atmospheres occurs at cesium loadings of one-half gram per gram of charcoal. Accordingly, cesium and rubidium fission products show little tendency to be swept past the internal fission product trap. Copper iodide and copper bromide are somewhat volatile and show some tendency to pass through the trap after they are formed from fission product iodine and bromine. However, such passage times are long, of the order of 100 hours or more. Silver iodide and bromide are less volatile than the corresponding copper salts, and tend to be delayed even longer in the trap.

Cadmium passes through the trap with some delay. However, due to its low fission yield, cadmium does not contribute substantially to overall fission product activity.

Elemental barium, strontium, samarium, and europium tend to condense in the purge channels 79 and in the trap. Barium, strontium, samarium and europium which react in the gas phase with residual carbon monoxide which may be present in small amounts (about 10 p.p.m.) in the helium purge gas, tend to form oxide aerosols which are not readily trapped.

However, barium, strontium, samarium, and europium also tend to react with chemisorbed oxygen on graphite and activated charcoal surfaces of the trap and in such event tend to adhere to such surfaces.

Antimony tends to readily condense in the trap if it does not condense earlier, i.e., in purge channels 79, etc. In any event, antimony is not very important because of its relatively low concentration with respect to total fission product yield.

Accordingly, the internal fission product trap 71 delays migration of a substantial proportion of the fission products for a substantial period of time. It will be understood that the fuel element 11 can be constructed with other internal fission product traps, such as those disclosed in co-pending U.S. application, Serial No. 753,950, filed August 8, 1958, and entitled Fuel Element (now U.S. Patent 3,010,889, issued November 28, 1961, in the names of P. Fortescue and L. R. Zumwalt), in place of trap 71. Moreover, the internal fission product trap can be omitted, if desired. However, use of an internal trap such as trap 71 is preferred.

Fission products eventually passing from the trap 71 are swept into passageways 117 and 119 and can be carried, as previously indicated, to additional traps located outside the reactor core, as indicated in FIGURE 2, without substantial leakage of purge gas into the main coolant circuit.

Such external fission product traps may be, for example, one or more chemical traps and/or physical traps. The latter may comprise cool and/or cold traps, particularly suitable for trapping xenon and krypton by adsorption. The cool trap, for example, may operate at from about 650° F. and the cold trap may, for example, operate at about the temperature of liquid nitrogen or less, preferably in the presence of an adsorber, such as charcoal.

In the cool and cold traps, substantially all remaining fission products are trapped and the purified coolant gas may then be returned to the primary circuit for reuse.

For handling of the fuel element 11, i.e., moving it to and from the reactor core, the top reflector block 85, which may be a solid block of graphite, etc., is provided with a pointed head 121 and and neck 123 readily engageable by a grappling means (not shown). In addition, the diameter of the fuel element is slightly enlarged in a region 125 just above the active portion of the fuel element, the enlargement serving as the spacing means 33 for the fuel element. Thus, for example, the diameter of the fuel element 11 may be 3.500 inches, but region 125 may have a diameter of 3.535 inches. Gas pressure around the periphery of the side reflector of the core provides the lateral force to hold a plurality of the fuel elements 11 in place in the reactor core.

The vertically extending stand-off 14 connected to the reactor grid plate is received within cavity 107 of the fuel element. As illustrated in FIGURE 1, cavity 107 of fuel element 11 is relatively long so that the fuel element can stand alone in the reactor core and need not be otherwise orientated radially. The cavity is generally conical shaped and dimensioned such that two gas sealing mechanisms are provided. At room temperature, the conical shaped seat 185 of the coupling 63 rests on the stand-off and provides a good seal to prevent back leakage of helium.

Moreover, since the stand-off is metallic, and the coupling is preferably graphite, as the temperature of the stand-off and coupling increases in the reactor core, the stand-off increases in diameter at a greater rate than the coupling, i.e., a higher coefficient of thermal expansion, and the gap between the cavity wall and stand-off decreases from, for example, about 0.005 inch to 0.001 inch. Helium leakage is reduced to a permissible rate, about 10 percent of the total purge flow from the fuel element. Back diffusion of fission products is minimized by the length of the cavity 107.

Accordingly, fission products in purge gas readily pass from the fuel element through the stand-off passageway and are conveyed to the described external fission product trap with the desired minimal leakage.

Fuel element 11 may, for example, have the following dimensions:

TABLE II
*Typical Dimensions of Fuel Element 11*

| | Inches |
|---|---|
| Fuel slugs: | |
|     Core diameter | 1.500 |
|     Slug diameter | 2.250 |
|     Slug length | 4.500 |
| Total length of fuel slugs | 90.00 |
| Fuel can wall thickness | 0.250 |
| Sleeve wall thickness | 0.375 |
| Fuel element diameter | 3.500 |
| Fuel element length | 144.00 |
| Top reflector length | 27.00 |
| Bottom reflector length | 27.00 |
| Trap length | 12.00 |
| Trap channel length | 11.00 |
| Trap channel diameter | 0.625 |

Accordingly, FIGURE 1 illustrates a fuel element which is constructed to provide a counterflow of coolant gas therethrough to serve as a purge stream for fission products passing from the fuel compacts. In this regard, the primary coolant in the reactor core flows outside the fuel elements in an upward direction. The coolant gas purge stream enters fuel element 11 at the lower end thereof, as previously described, and flows upwardly therein between the fuel can and container, then down at the upper end of the fuel can through the can gas inlet and down between the fuel compacts and can into the fission product trap, sweeping fission products therewith. The purge stream passes down through the trap and into the passageway in the coupling to the stand-off passageway, whereupon it passes from the fuel element to external traps, as previously described.

The described counterflow purge system, together with double walled containment of the compacts and other features, control migration of fission products in a unique and effective manner.

A second embodiment of the fuel element of the present invention is set forth in FIGURE 4 of the accompanying drawings. In FIGURE 4, a fuel element 127 is illustrated which is essentially similar in components and in parameters to fuel element 11 of FIGURE 1. However, fuel element 127 is arranged to provide for a parallel flow of purge gas therethrough, as hereinafter more particularly described. It will be understood with regard to the following description of the embodiment set forth in FIGURE 4, and also with the succeeding embodiments of FIGURES 5 and 6, that unless otherwise specified, components generally similar to those of the embodiment of FIGURE 1 are constructed of similar materials and in a similar manner.

Now referring more particularly to FIGURE 4, fuel element 127 comprises a plurality of fuel compacts 129 maintained in stacked relation and sealed within fuel can 131. Fuel can 131 is constructed of low permeability moderator and has a side-wall 133 sealed and bonded, as by brazing, etc., at the upper end to a top closure 137. The fuel compacts, sidewall, support coupling and top closure are essentially as described for comparable components of fuel element 11, except that support coupling 135 has a transversely extending space 139 therein communicating with the lower ends of a plurality of purge channels 141 between the fuel can and container 143 and with the longitudinally extending passageway 145, as illustrated in FIGURE 4. Channels 141 are formed of longitudinal grooves 146 in the outer surface of the can and/or the inner surface of the container, which grooves are interconnected by a network of scratches 148, etc., in the outer surface of the can and/or inner surface of the container.

Passageway 145 extends between the cavity 147 in the coupling of the fuel element 127 and a fission product trap 149 disposed in the fuel can below the compacts 129 and separated therefrom by a porous block 151 of the moderator. Trap 149, as illustrated in FIGURE 4, is constructed similarly to the trap 71 of FIGURE 1. Also within the can is a porous block 153 of moderator separating the compacts from the upper end of the fuel can.

Top closure has a gas inlet 155 therein comprising a coolant gas-porous plug 157. The top closure is separated from block 153 by space 159 communicating with a plurality of channels 161 extending down between the compacts and fuel can. Channels 161 are formed of a plurality of longitudinal grooves in the inner surface 163 of the sidewall and extend between space 159 and fission product trap 149.

The fuel can is tightly disposed within the container 143, the latter also being largely formed of low permeability moderator, as described for the container of FIGURE 1. A sleeve 165 is securely connected at the upper end to a top reflector block 167 and at the lower end to a bottom fixture 169 portion of the support coupling 135, as by brazing, etc. The end fixture and sleeve are similar to those of fuel element 11. So also is the top reflector block, including spacer means 168, head 170 and neck 172, and also including a lower end 171 of low permeability moderator, except that a generally central passageway 173 is provided in the top reflector block which passageway extends through the lower end 171 of the block into communication with a space 175 above the top closure 137 and also up into the upper porous moderator portion 177 of the block 167. Accordingly, coolant purge gas passes inwardly of the fuel element 127 through the gas porous portion 177 and into passageway 173, then down into space 175, which space 175 is in communication with channels 141, and also with porous plug 157. Accordingly, purge gas passes down simultaneously between the fuel can and container, and also down between the compacts and fuel can, the latter flow by way of plug 157, space 159 and channels 161. This unique parallel flow of purge gas is effective in aiding attenuation of fission products in the fuel element. The fuel element also incorporates double-walled containment of the fuel compacts and other features aiding such attenuation.

The purge stream passing down through channels 141 between the fuel can and container sweeps fission products in that area to transverse space 139 and therethrough to passageway 145. The purge stream passing down through channels 161 between the fuel compacts and fuel can sweeps fission products in that area to the trap 149. Those fission products finally passing from the trap are carried through the porous bottom end 179 thereof into cavity 145. The combined purge stream passes through cavity 147 to a mating passageway 181 in a stand-off 183 positioned, as illustrated in FIGURE 4, within the cavity 147, for removal from the fuel element to external traps, etc., as previously described.

A third embodiment of the fuel element of the present invention is illustrated in FIGURE 5. In FIGURE 5, a fuel element 185 is illustrated which is substantially identical to the fuel element 127 of FIGURE 4 in most components, parameters, method of construction, etc. However, fuel element 185 does not have a gas inlet at the upper end of the fuel can and accordingly does not provide for substantial downward flow of purge gas between the compacts and fuel can. However, fission product gases pass down between the compacts and fuel can to the internal trap.

Referring more particularly to FIGURE 5, fuel compacts 187 are disposed between porous moderator blocks 189 and 191 and above a fission product trap 193, such as that previously described, in a low permeability moderator fuel can 195. The can 195 is formed of a sidewall 197, a support coupling 199 and top closure 201, the latter containing no gas inlet. The coupling has a longitudinal passageway 203 extending between a stand-off-receiving cavity 205 and the trap, and a transverse space 206 extending between the lower end of purge channels 207 (disposed between between the fuel can and a closely fitting low permeability moderator container 209) and passageway 203.

A space 211 above block 191 and below closure 201 communicates with channels 213, the latter extending between the compacts and fuel can, and terminating at about the level of the trap 193. The low permeability container 209 tightly disposed around the fuel can comprises sleeve 215, bottom end fixture 216 and top reflector block 217 secured together. The top reflector block, with its head 219, neck 221 and spacer means 223, central purge entrance passageway 225 extending through its low permeability lower end 227 and a part of its upper porous portion 229 is identical with the top reflector block of fuel element 127 of FIGURE 4. A space 231 below end 227 and above closure 201 communicates with purge channels 207 disposed between the fuel can and container.

Thus, coolant purge gas passes into fuel element 185 through portion 229 and down through passageway 225 into space 231, then into channels 207 between the can and container. The purge stream sweeps fission products in that area down to space 206, wherein fission products pass to passageway 203, and out of the fuel element through a mating passageway 233 in a stand-off 235 disposed in cavity 205.

Fission product gases also pass down through channels 213 and to and through trap 193, existing the fuel can through the bottom end 237 of the trap and passing into passageway 203 for removal from the fuel element. Accordingly, effective double walled containment of the fuel compacts is obtained while still providing for effective removal from the fuel element of fission products migrating through the fuel can into channels 207 and also for fission products passing down through the fission product trap.

A fourth embodiment of the fuel element of the present invention is set forth in FIGURE 6 of the accompanying drawings. In FIGURE 6, a fuel element 239 is illustrated, which is similar to the previously described emobdiments of FIGURES 1, 4 and 5 in most components, construction and parameters. However, fuel element 239 is single-walled. More particularly, fuel element 239 comprises a low permeability moderator fuel can 241 having a sidewall 243 sufficiently thick to afford a permeation coefficient approximately equal to that exhibited by the previously described embodiments. In this regard, the sidewall 243 may, for example, be about 0.375 inch thick, or approximately the combined thickness of the sleeve and can sidewall of the fuel elements of each of the preceding three embodiments. The can 241 is sealed at the bottom by support coupling 245 and at the top by closure 247 containing porous plug 249 as a gas inlet. The coupling contains a stand-off-receiving cavity 251, longtiudinal passageway 253 communicating therewith and with the bottom end 255 of a fission product trap 257. There is no necessity for a transverse space such as space 206 of fuel element 185, inasmuch as only one purge stream passes through fuel element 239.

Within the fuel can 241 are disposed fuel compacts 259 separated by porous moderator blocks 261 and 263 from the trap 257 positioned below the compacts and from the closure 247 positioned above the compacts. A space 265 is provided between closure 247 and block 263 and communicates with plug 249 and with channels 267 disposed between the compacts and the fuel can. Channels 267 extend down to the fission product trap 257. A top reflector block 269 of moderator is secured to the upper end of sidewall 243 and the top of closure 247, as by brazing, etc. The top refletcor block is provided with a head 271, neck 273 and spacer means 275 similar to those of the preceding embodiments, and also contains a centrally disposed longitudinal purge entrance passageway 277 extending down through a low permeability bottom 279 of the block 269 to plug 249 and terminating at its upper end in a porous moderator portion 281 of the block.

Accordingly, an effective purge stream system is provided whereby coolant purge gas enters the fuel element 239 through the porous portion 281, passes into the passageway 277 and down therein to and through plug 249 and into space 265 wherein it is distributed to channels 267.

In channels 267 the gas passes down as a purge stream, sweeping fission products therewith to trap 257. The purge stream exits the trap at the bottom 255 thereof, passing into passageway 253, whereupon it is conducted to a mating passageway 283 of a stand-off 285 for removal from the fuel element.

It will be understood that the embodiments set forth in FIGURES 4, 5, 6, as well as that of FIGURE 1, can be constructed to successfully operate without an internal fission product trap, although such a trap is preferred.

Accordingly, an improved fuel element has been described which features a unique system for the retention and attenuation of fission products. The fuel element is capable of highly efficient and safe operation at elevated temperatures over extended periods of time without breakdown and without deleterious fission product buildup in the primary coolant circuit.

Since the fuel element utilizes enriched fuel, the reactor core can be kept relatively small. The core can be adequately cooled with highly satisfactory heat transfer when the gas coolant, preferably helium, is utilized at a modest pressure of about 20 atmospheres.

Since the fuel element of the present invention is capable of operating at high temperatures, for example, 2000° F. or more, heat transfer from the fuel element to the surrounding cooling gas is carried out in a highly improved manner.

A further advantage of operating at high temperatures with the fuel element of the present invention is that Wigner stored energy effect and growth problems in graphite can be avoided. Such problems are overcome since at the usual operating temperatures contemplated for the fuel elements of the present invention, the radiation effects of the fuel on the graphite are continually annealed. Other advantages of the present invention are as set forth in the foregoing.

It will be appreciated that such modifications in the components of the fuel element of the present invention, in their combination, and in their methods of fabrication as are within the skill of those versed in the art are contemplated as being within the scope of the present invention.

We claim:
1. A fuel element for a neutronic reactor, said fuel element comprising an outer container fabricated of neutron moderating material having a low permeability to fission products and containing a gas porous inlet and a gas outlet, said container gas outlet being disposed at the bottom end of said container, a fuel can fabricated of neutron moderating material having a low permeability to fission products disposed wholly within said outer container, the adjacent surfaces of said can and container being arranged to provide a plurality of purge channels between said can and said container, said channels communicating with said porous gas inlet of said container and said bottom gas outlet of said container, at least one of said adjacent surfaces of said fuel can and said outer container having a plurality of circumferential grooves providing passageways interconnecting said channels, said can having a gas inlet and a gas outlet, said can gas outlet being positioned at the bottom end of said can and communicating with said container gas outlet, at least one fuel compact disposed within said can in a manner to provide a space between said compacts and said can which space communicates with said can gas inlet, and a fission product trap disposed within said can below said compacts.

2. A fuel element for a neutronic reactor, said fuel element comprising an outer container fabricated of neutron moderating material having a low permeability to fission products and containing a gas porous inlet and a gas outlet, said gas outlet being at the bottom end of said container, a fuel can fabricated of neutron moderating material having a low permeability to fission products disposed wholly within said outer container, the adjacent surfaces of said can and container being arranged to provide a plurality of purge channels between said can and container, said channels communicating with said porous inlet of said container and said bottom gas outlet of said container, with at least one of said adjacent surfaces of said fuel can and said outer container having a plurality of circumferential grooves providing passageways interconnecting said channels, said can having a gas inlet and a bottom gas outlet, said can gas outlet communicating with said container gas outlet, at least one fuel compact disposed within said can, each of said fuel compacts comprising a mixture of fuel material fissionable by neutrons of thermal energy and graphite disposed around a central core of graphite, said fuel compacts being disposed within said can in a manner to provide a gas space between said fuel compacts and can which space communicate with said can gas inlet, and a fission product trap disposed within said can below said fuel compacts and communicating with said gas space and said can gas outlet, said trap comprising neutron moderating material in which are disposed fission product-adsorbent material and electropositive metallic material.

3. A fuel element for a neutronic reactor, said fuel element comprising an outer container fabricated of graphite having a low permeability to fission products and containing a gas porous inlet and a gas outlet, said gas outlet being located adjacent the bottom end of said container, a fuel can fabricated of graphite having a low permeability to fission products disposed wholly within said graphite container, the adjacent surfaces of said can and container being arranged to provide a plurality of purge channels between said can and container, said channels communicating with said container gas porous inlet and said container gas outlet, at least one of said adjacent surfaces of said can and container also having a plurality of circumferential grooves providing passageways interconnecting said channels, said can having a gas inlet and a bottom gas outlet, said can gas outlet communicating with said container gas outlet, and at least one fuel compact disposed within said can in a manner to provide a gas space between said compacts and said can, each of said compacts comprising a mixture of uranium-235 carbide, thorium-232 carbide and graphite disposed annularly around a central core of graphite, and a fission product trap disposed within said can below said fuel compacts and communicating with said gas space and said can gas outlet, said trap comprising a block of graphite having a plurality of finely divided spaces therein containing absorbent charcoal with metallic copper dispersed therein.

4. A fuel element for a neutronic reactor, said fuel element comprising an outer container fabricated of neutron moderating material having a low permeability to fission products and containing a gas inlet at the bottom thereof and a gas outlet also at the bottom thereof but spaced from said gas inlet, a fuel can fabricated of neutron moderating material having a low permeability to fission products disposed wholly within said container, the adjacent surfaces of said can and container being arranged to provide a plurality of purge channels between said can and said container, said channels communicating with said container gas inlet and said container gas outlet, at least one of said adjacent surfaces of said can and container having a plurality of circumferential grooves providing passageways interconnecting said channels, said can having a porous gas inlet at the upper end thereof and a gas outlet at the bottom end thereof, said can gas outlet communicating with said container gas outlet, at least one fuel compact disposed wholly within said can in a manner to provide a purge space between said compacts and said can, said purge space communicating with said can gas inlet, and a fission product trap disposed within said can below said fuel compacts and communicating with said purge space and said can gas outlet.

5. A fuel element for a neutronic reactor, said fuel element comprising an outer container fabricated of neutron moderating material having a low permeability to fission products and containing a gas inlet at the bottom end thereof and a gas outlet at the bottom end thereof but spaced from said gas inlet, a fuel can fabricated of neutron moderating material having a low permeability to fission products disposed wholly within said container, the adjacent surfaces of said can and container being arranged to provide a plurality of purge channels between said can and said container, said channels communicating with said container gas inlet and said container gas outlet, at least one of said adjacent surfaces of said can and said container having a plurality of circumferential grooves providing passageways interconnecting said channels, said can having a gas inlet at the upper end thereof and a gas outlet at the bottom end thereof, said can gas outlet communicating with said container gas outlet, at least one fuel compact disposed wholly within said can in a manner to provide purge space between said compacts and said can, each of said fuel compacts comprising a mixture of fuel material fissionable by neutrons of thermal energy and graphite disposed around a solid central core of graphite, said purge space communicating with said can gas inlet, and a fission product trap disposed within said can below said fuel compacts and communicating with said purge space and said can gas outlet, said fission product trap comprising neutron moderating material in which are disposed fission product-adsorbent material and electropositive metallic material.

6. A fuel element for a neutronic reactor, said fuel element comprising an outer container fabricated of neutron moderating material having a low permeability to fission products containing a gas inlet at the bottom end thereof and a gas outlet at the bottom end thereof but spaced from said gas inlet, a fuel can fabricated of neutron moderating material having a low permeability to fission products disposed wholly within said container, the adjacent surfaces of said can and container being arranged to provide a plurality of purge channels between said can and container, said channels communicating with said container gas inlet and said container gas outlet, at least one of said adjacent surfaces of said can and said container having a plurality of circumferential grooves providing passageways interconnecting said channels, said can having a gas porous inlet region at the upper end thereof and a gas outlet at the bottom end thereof, said can gas outlet communicating with said container gas outlet, at least one fuel compact disposed wholly within said can in a manner to provide purge space between said compacts and said can, each of said fuel compacts comprising a mixture of uranium-235 carbide, thorium-232 carbide and graphite disposed annularly around a central core of graphite, said purge space communicating with said can gas inlet, a fission product trap disposed within said can below said fuel compacts and communicating with said purge space and said can gas outlet, said fission product trap comprising a block of graphite having a plurality of spaces containing adsorbent charcoal with metallic copper dispersed therein.

7. A fuel element for a neutronic reactor, said fuel element comprising an outer container fabricated of neutron moderating material having a low permeability to fission products and containing a gas porous inlet at the upper end thereof and a gas outlet at the bottom end thereof, a fuel can fabricated of neutron moderating material having a low permeability to fission products disposed wholly within said outer container, the adjacent surfaces of said can and container being arranged to provide a plurality of purge channels between said can and container, said channels communicating with said porous gas inlet of said container and with said gas outlet of said container, at least one of said adjacent surfaces of said fuel can and said outer container also having a plurality of circumferential grooves providing passageways interconnecting said channels, said fuel can having a gas inlet at the upper end thereof and a gas outlet at the bottom end thereof, said can gas inlet communicating with said container gas inlet and said can gas outlet communicating with said container gas outlet, at least one fuel compact disposed wholly within said can in a manner to provide a purge space between said compacts and said can, said purge space communicating with said can gas inlet, and a fission product trap disposed within said can below said fuel compacts and communicating with said purge space and said can gas outlet.

8. A fuel element for a neutronic reactor, said fuel element comprising an outer container fabricated of neutron moderating material having a low permeability to fission products and containing a gas porous inlet at the upper end thereof and a gas outlet at the bottom end thereof, a fuel can fabricated of neutron moderating material having a low permeability to fission products disposed wholly within said outer container, the adjacent surfaces of said can and container being arranged to provide a plurality of purge channels between said can and container, said channels communicating with said gas inlet and with said gas outlet, at least one of said adjacent surfaces of said fuel can and outer container also having a plurality of circumferential grooves providing passageways interconnecting said channels, said fuel can having a gas porous inlet at the upper end thereof and a gas outlet at the bottom end thereof, said can gas inlet communicating with said container gas inlet and said can gas outlet communicating with said container gas outlet, at least one fuel compact disposed wholly within said can in a manner to provide purge space between said compacts and said can, each of said fuel compacts comprising a mixture of fuel material fissionable by neutrons of thermal energy and graphite disposed around a solid central core of graphite, said purge space communicating with said can gas inlet, and a fission product trap disposed within said can below said fuel compacts and communicating with said purge space and said can gas outlet, said fission product trap comprising neutron moderating material in which are disposed fission product-adsorbent material and electropositive material.

9. A fuel element for a neutronic reactor, said fuel element comprising an outer container fabricated of graphite having a low permeability to fission products and containing a gas porous inlet at the upper end thereof and a gas outlet at the bottom end thereof, a fuel can fabricated of graphite having a low permeability to fission products disposed wholly within said outer container, the adjacent surfaces of said can and container being arranged to provide a plurality of purge channels between said can and container, said channels communicating with said gas porous inlet and with said gas outlet, at least one of said adjacent surfaces of said fuel can and outer container also having a plurality of circumferential grooves providing passageways interconnecting said channels, said fuel can having a gas porous inlet at the upper end thereof and a gas outlet at the bottom end thereof, said can gas inlet region communicating with said container gas inlet and said can gas outlet communicating with said container gas outlet, at least one fuel compact disposed wholly within said can in a manner to provide purge space between said compacts and said can, each of said fuel compacts comprising a mixture of uranium-235 carbide, thorium-232 carbide and graphite disposed annularly around a solid central core of graphite, said purge space communicating with said can gas inlet and a fission product trap disposed within said can below said fuel compacts and communicating with said purge space and said can gas outlet, said fission product trap comprising a block of graphite having a plurality of spaces containing particulate adsorbent charcoal with metallic copper dispersed therein.

References Cited in the file of this patent

UNITED STATES PATENTS

| | | |
|---|---|---|
| 2,777,812 | Powell et al. | Jan. 15, 1957 |
| 2,798,848 | Kingdom | July 7, 1957 |
| 2,799,642 | Hunivity et al. | July 16, 1957 |
| 2,851,409 | Moore | Sept. 17, 1958 |
| 2,873,853 | Burton | Feb. 17, 1959 |
| 3,010,889 | Fortescue et al. | Nov. 28, 1961 |
| 3,028,329 | Mahlmeister | Apr. 3, 1962 |
| 3,039,947 | Fortescue et al. | June 19, 1962 |

FOREIGN PATENTS

| | | |
|---|---|---|
| 1,187,405 | France | Mar. 2, 1959 |
| 809,586 | Great Britain | Feb. 25, 1959 |

OTHER REFERENCES

AEC Document ORNL-2676, December 31, 1958, pp. 105-120, available from Office of Technical Services, U.S. Dept. of Commerce, Washington 25, D.C., price $3.00.